United States Patent [19]

Le Quesne

[11] Patent Number: 5,122,241
[45] Date of Patent: Jun. 16, 1992

[54] PROCESS FOR THE HYDROMETALLURGICAL TREATMENT OF A SOLUTION OF MATERIALS CONTAINING GALLIUM

[75] Inventor: Yves Le Quesne, Paris, France

[73] Assignee: Metaleurop S.A., Fontenay-sous-Bois, France

[21] Appl. No.: 391,507

[22] PCT Filed: Nov. 24, 1988

[86] PCT No.: PCT/FR88/00574
  § 371 Date: Jul. 24, 1989
  § 102(e) Date: Jul. 24, 1989

[87] PCT Pub. No.: WO89/04878
  PCT Pub. Date: Jun. 1, 1989

[30] Foreign Application Priority Data

Nov. 24, 1987 [FR] France .................. 87 16291

[51] Int. Cl.⁵ .................. C01G 15/00; C25C 1/22
[52] U.S. Cl. .................. 204/105 R; 423/112; 423/DIG. 14
[58] Field of Search ....... 423/112, 116, 126, DIG. 14; 204/105 R

[56] References Cited

U.S. PATENT DOCUMENTS

| | | | |
|---|---|---|---|
| 4,094,753 | 6/1978 | Charlton | 204/105 R |
| 4,666,575 | 5/1987 | Kubo | 204/105 |
| 4,759,917 | 7/1988 | Coleman | 423/112 |
| 4,927,609 | 5/1990 | Leveque et al. | 423/21.5 |

FOREIGN PATENT DOCUMENTS

| | | |
|---|---|---|
| 0219213 | 4/1987 | European Pat. Off. |
| 271845 | 6/1988 | European Pat. Off. ............ 423/495 |
| 3235136 | 3/1984 | Fed. Rep. of Germany. |
| 2184108 | 7/1987 | United Kingdom. |

OTHER PUBLICATIONS

Patent Abstracts of Japan, vol. 11, No. 53 (C-404)(2500), Feb. 19, 1987.

*Primary Examiner*—Melvyn J. Andrews
*Attorney, Agent, or Firm*—Fleit, Jacobson, Cohn, Price, Holman & Stern

[57] ABSTRACT

A process of hydrometallurgical treatment of a solution of materials containing gallium and at least one metalloid from Group V of the periodic table of the elements which comprises adding hydrochloric acid and an alkali metal chloride or an alkaline earth metal chloride to said solution to form gallium chloride so that the concentration of chloride ions, not counting those bonded to gallium, is in a range of from 4 to 10 N and the acidity of said solution is in a range of from 1 to about 5 N. Then placing the adjusted solution in contact with an organic phase comprising at least one neutral pentavalent phosphorus compound having a phosphorus-oxygen double bond, wherein the gallium chloride is extracted by the organic phase and reextracting the gallium from the organic phase.

14 Claims, No Drawings

PROCESS FOR THE HYDROMETALLURGICAL TREATMENT OF A SOLUTION OF MATERIALS CONTAINING GALLIUM

The present invention relates to the recovery of gallium contained in various raw materials or secondary raw materials together with impurities such as the metalloids of Group V of the periodic table of the elements.

More particularly it relates to the treatment either of solutions of gallium chloride, or of materials containing gallium in the wholly or partially reduced state.

As an example of reduced materials of this kind containing gallium may be mentioned gallium metal and the phosphides, arsenides, nitrides and antimonides of this metal.

Gallium, whether present in primary or secondary raw materials, is often combined with Group V elements: thus, the dust from phosphorus plants, the residues from processing of gallium arsenide and gallium phosphide and so on.

For economic reasons, it is preferable that the processes for the treatment of these products or of these solutions employ techniques of the chloride route already partially perfected for the primary recovery of gallium where impurities of this kind do not occur. In general these techniques employ trialkyl phosphates, particularly the most common of these tributyl phosphate, currently designated by its letter symbol in English TBP, which will serve as a paradigm for this family (cf. Science and Technology of tributyl phosphate, volume 2, pages 97–99, RC Press Inc).

An initial difficulty lies in the presence, among the materials containing gallium, of other elements having similar chemical properties such as, for example, indium and more generally metals having volatile suboxides. Furthermore, the Group V elements often have properties similar to those of III compounds, which makes separation difficult.

According to the conventional techniques for the recovery of gallium, this element is brought into hydrochloric acid solution and is recovered by liquid-liquid extraction of the gallium trichloride formed by means of liposoluble complexing agents of Lewis acids, agents such as amines and neutral organophosphorus compounds of the trioctylphosphine oxide (TOPO) and tributyl phosphate (TBP) type.

A second difficulty in the treatment of these secondary raw materials lies in the particularly pyrophoric and inflammable nature of these products and of the gases which they produce from their reaction with water. Thus in aqueous phases gallium phosphide produces phosphines, compounds which are very inflammable, certain of which would be the source of the combustion of natural evolutions of methane and would cause what is commonly called "will-o'-the-wisps".

It is also advisable to mention that the hydrogenous compounds of arsenic, antimony and phosphorus are highly toxic.

One of the objects of the present invention is to provide a process derived from the processes above but adapted to the particular problems of materials containing gallium mentioned above.

Thus, one of the objects of the present invention is to provide a process which enables, starting from the same extractive reactants as previously used, a good separation of gallium in the form of the chloride to be ensured from the Group V metalloids or from the impurities which are likely to be present in wastes of gallium III–V compounds or in other sources of supply of materials containing gallium. Among these impurities may be mentioned indium and antimony.

These objects as well as others which will appear subsequently are achieved by means of a process of hydrometallurgical treatment of a solution of materials containing gallium comprising in addition at least one metalloid from Group V of the periodic table of the elements, characterized in that it comprises the following steps:

b) adjustment of the concentration of chloride ions and the acidity of the solution to be extracted (for example obtained from step a) described below by addition of hydrochloric acid and an alkali metal chloride or an alkaline earth metal chloride;

c) placing the said solution in contact with an organic phase comprising at least one neutral pentavalent phosphorus compound having a phosphorus-oxygen double bond.

Once the gallium placed in solution at a concentration preferably at least equal to 20 g/l, advantageously from 30 to 200 g/l (the zeros not being significant figures), it is advisable to make it suitable for extraction by neutral pentavalent phosphorus compounds by controlling the level of acidity and the concentration of chloride ions so that the latter reaches a value in the range 4 to 10N, while the level of acidity must be greater than 1N, preferably greater than 3N, advantageously about 5N.

The liquid-liquid extraction, after this adjustment, is preferably carried out with phosphorus compounds of the above type which are commercially available, such as TOPO or preferably the most common trialkylphosphate, that designated by the English acronym TBP English (tributylphosphate).

With the aim of better controlling the liquid-liquid extraction, both with regard to the level of viscosity and to the chemical properties, it is desirable that the trialkyl phosphate should be dissolved in aromatic hydrocarbons; in general petroleum fractions having a high boiling point and a high ignition point, such as those of the type sold under the trademark Solvesso 150, are used as aromatic hydrocarbons. Generally, for economic reasons, tributyl phosphate, better known under its English acronym TBP, is used as trialkyl phosphate.

The organic phase preferably contains from 20 to 60%, advantageously from 30 to 50% of trialkylphosphate by volume.

In order to be selective with regard to the impurities mentioned above, it is advisable to carry out the liquid-liquid extraction in such a way that the concentration of gallium chloride in the organic phase is at least equal to 90%, preferably to 95%, advantageously to 99% of its saturation value if it were the only extractable element.

In order to do this, adjustment is made essentially to the ratio of the organic phase to the aqueous phase limiting it as much as possible. As a guide, it will be possible to adjust the quantity of phosphorus compounds used per unit of gallium present in the solution (control of outputs). A ratio of two molecules of organophosphorus compounds per molecule of gallium chloride must be sought. It is thus preferable to be operating in the section of the extraction isotherm where this curve forms a quasi plateau. This is achieved particularly by adjusting the prescribed level of chloride and the prescribed level of acidity in step b). Thus, the ratio of the saturation value to the actual extraction value must be as close as possible to 1, hence the importance of obtaining very high gallium concentrations and, indeed, from step a) described below, equally high solids contents of the suspension, preferably in the range 50 to 500 grams per liter (to one significant figure).

Finally, to be more selective with regard to arsenic, the latter being less well extracted by the phosphorus compounds in the V form than in the III form, it is advantageous that an oxidation is carried out in such a way that at least two thirds, preferably 95%, advantageously 99% of the arsenic is present in the pentavalent form. This oxidation can be carried out at the time of the possible step a) below. This ratio, following Nernst's Law determines the redox potential of the solution. A satisfactory potential is a potential which is in the region of 1 V with reference to the Ag/AgCl electrode.

When the organic phase contains some other impurity, it is possible to wash this phase with solutions of concentrated gallium chloride. One of the best possibilities is to wash the said organic phase with an HCl-$CaCl_2$ mixture at the highest possible O/A ratio. The gallium chloride thus obtained can advantageously be recycled for example in the aqueous suspension phase of the possible step a) below.

The number of extraction stages is determined so that the extraction of gallium should be as complete as possible with as low as possible a concentration of impurities at the outlet. The number of stages is generally within the range 3 to 5.

Another object of the present invention is to provide a leaching process for compounds containing gallium mentioned above which gives gallium chloride and which avoids or limits the formation of toxic or inflammable gases.

Another aim of the present invention is to provide an aggressive process which avoids any untimely ignition of these materials containing gallium.

It is noteworthy that avoidance of ignition of these materials containing gallium or the gases which they generate is particularly important when these materials containing gallium comprise in addition organic diluents such as those used during processing of III-V compounds.

This object is achieved by means of the addition, before step b) of the following step: a) placing gallium in solution by attacking a suspension of the said materials containing gallium with chloride;

Attacking compounds of this type with chlorine is known per se but it is particularly difficult to carry out in aqueous media. It is for this reason that in a recent patent application (European Patent Application published under No. 0,219,213 filed by the company SUMITOMO METAL MINING), it has been proposed to attack compounds of this type in a bath of molten salts whose principal constituent is arsenic chloride. This has led to carrying out the separation of the arsenic chloride from gallium chloride by distillation, despite the difficulty of a technique of this type.

In general, when chlorine is used in the aqueous phase to attack compounds of this type there is a high risk of explosion and particularly expensive equipment is necessary to avoid the risks of fire as well as poisoning.

During the study which led to the present invention it was possible to demonstrate that operating in regions, at least at the start of the reaction, where it is not usual to operate for dissolving gallium, that is at a pH where chloride is not present in solution (disproportionation > about 3) and where gallium is normally insoluble as it is precipitated in the form of the trihydroxide, it was possible to avoid any ignition and any evolution of toxic materials.

It is preferable that the temperature of the solution during the aggressive step a) should be less than 80° C., advantageously at most equal to 50° C. (these two latter values are given to a single significant figure).

When chlorine is mentioned, it must be understood to mean not only gaseous chlorine but also any operation capable of generating chlorine "in situ". As examples of the evolution of chlorine "in situ" may be mentioned electrolysis in a chloride medium and reactions opposite to that of the disproportionation of this halogen.

One of the possible embodiments of the present invention would comprise introducing chlorine in the form of hydrochloric acid and bleaching powder (mixed chloride and hypochlorite of lime one of the proposed formulae of which is CaClOCl), with the provision that the acidity limits specified above are followed.

One of the satisfactory ways of carrying out the reaction comprises starting with an aqueous phase having a pH within the range above (absence of dissolved chlorine and presence of precipitates of gallium hydroxide), namely a pH within the range 3 to 8, forming a pulp with the product containing gallium (step a) and bubbling chlorine gas through it, then the temperature is allowed to rise under the effect of the reaction exotherm.

After step c), it is possible to carry out, according to techniques known to practitioners of the art, a rinsing of the organic phase to eliminate particles of the aqueous phase which have been entrained in the organic phase. A washing of this type occurs in Example 4.

Step c) of liquid-liquid extraction can be followed, as far as the aqueous phase is concerned by a step of recovery or elimination of arsenic. These steps are known per se. As recovery step, may be mentioned a reduction of arsenic V to arsenic III followed by a distillation known per se of the arsenic trichlorides. From the environmental aspects, it is also possible to precipitate the arsenic in the form of arsenate of lime and iron arsenate by adding one of these two elements in an appropriate form and adjusting the pH to the pH from precipitation of the arsenate of lime and the iron arsenate. The chloride solutions thus obtained can possibly be the subject of recycling to step a) or, after evaporation and salt formation, to step b).

The organic phase loaded with gallium chloride, possibly washed as described above, can be eluted in a step d) either by an aqueous phase which is lean in chloride ions (less than 1N, preferably less than 0.1N), or preferably reextracted by a medium containing sodium ions to form on the one hand a gallate of sodium or of another alkali metal and on the other hand sodium chloride or the chloride of another alkali metal.

This solution allows complete regeneration of TBP and allows in addition a step e) for recovery of gallium by electrolysis.

For this electrolysis step e), it is preferable that the concentration of free base ($OH^-$) is greater than 4N. It is thus possible to carry out step d) of sodium carbonate elution, either by placing in contact with sodium carbonate at a quantity and in a concentration such that the residual sodium carbonate is at least equal to 0.1N, preferably equal to 0.5N, and subsequently adjusting the quantity of base, or by placing the TBP solution in contact with a base in a quantity and a concentration such that, after the reextraction, the quantity of residual base is at least equal to 4N.

Thus the electrolysis step is preferably carried out with a sodium carbonate concentration at least equal to about 4N at current densities within the range 80 (to one significant figure) and 300 (to one significant figure) $A/m^2$ and at a temperature in the range 35° to 50° C.

The examples which follow and which do not introduce any limiting characteristic are intended to enable specialists to determine readily the operating conditions which it is advisable to use in each particular case.

EXAMPLE 1

100 g of gallium arsenide process sludges containing 45.5% of gallium and 47.9% of arsenic are placed in suspension in 500 ml of water. No arsine ($AsH_3$) is detected above the reaction vessel and no violent reaction is produced. Chlorine gas is subsequently injected into the stirred suspension at the rate of 80 g/h for 7 hours, during which the temperature rises to 75° C.

Once the attack is finished, the suspension is filtered, the residue is washed with water and 4.46 g of dry residue is recovered containing 19.4% of gallium and 0.60 l of aqueous solution containing gallium chloride. The lixiviation yield of gallium is thus greater than 98%.

EXAMPLE 2

100 g of gallium phosphide process sludges, containing 56.5% of gallium and 18.5% of phosphorus, are placed in suspension in 500 ml of water. No trace of phosphines ($PH_3$, $P_2H_4$, and so on) is detected above the reaction vessel and no ignition is produced. Chlorine gas is subsequently injected into the stirred suspension at the rate of 100 g/h for 7 hours. The temperature of the suspension rises to 76° C. during the reaction. When the attack is finished, the suspension is filtered, the residue is washed with water and 12.5 g of dry residue is recovered containing 0.76% of gallium and 600 ml of solution containing gallium chloride.

The lixiviation yield of gallium is thus greater than 99%.

EXAMPLE 3

100 g of broken gallium phosphide wafers, previously pulverized to a granulometry of $d_{80}=240$ μm, containing 71.1% of gallium and 25.7% of phosphorus are placed in suspension in 500 ml of water. No trace of phosphine ($PH_3$) is detected above the reaction vessel and no ignition is produced. Chlorine gas is subsequently injected into the stirred suspension at the rate of 100 g/h for 7 hours. The temperature of the suspension rises to 76° C. during the reaction. When the attack is finished, the suspension is filtered, the residue is washed with water and 0.97 g of dry residue is recovered containing 33.4% of gallium and 620 ml of solution containing gallium chloride.

The dissolution yield of gallium is thus greater than 99%.

EXAMPLE 4

By placing gallium in solution by using chlorine to attack a suspension of materials containing gallium defined in Examples 1, 2 and 3, and after addition of $CaCl_2$, a solution $PHA_{infl}$ is obtained whose potential relative to the Ag/AgCl electrode is about one volt and which is placed in contact, under countercurrent conditions in a battery of 4 mixer-settlers, with an organic phase formed by volume from 40% TBP and 60% SOLVESSO 150, while maintaining a ratio of organic phase to aqueous phase (O/A) of 0.9; after allowing the battery to reach chemical equilibrium, an organic phase $PHO_{eff}$ is obtained whose composition, like that of $PHA_{infl}$, is given in the table below.

In a second stage, this organic phase loaded with gallium is placed in contact with an aqueous phase titrating HCl=1N and $CaCl_2$=2M, so as to obtain an O/A ratio of 10, under countercurrent conditions in a battery of 4 mixer-settlers. The organic phase is thus completely purified and after allowing the battery to reach chemical equilibrium an organic phase $PHO_{lav}$ and an aqueous washing phase $PHA_{lav}$ are obtained whose respective compositions are given in the table below.

| Chemical Species | PHASES | | | | |
|---|---|---|---|---|---|
| | $PHA_{infl}$ | $PHA_{eff}$ | $PHO_{eff}$ | $PHO_{lav}$ | $PHA_{lav}$ |
| Ga in g/l | 46.1 | 0.2 | 51.1 | 46.2 | 49.2 |
| As in g/l | 23.6 | 23.4 | 0.164 | $5.10^{-3}$ | 1.6 |
| In in g/l | 0.46 | 0.45 | $10 \times 10^{-3}$ | $<10^{-3}$ | 0.1 |
| P in g/l | 8.7 | 8.6 | | | |
| $CaCl_2$ in M | 1.5 | 1.5 | | | 2 |
| HCl in N | 5 | 2.7 | | | 2 |
| Selectivity of recovery of gallium in relation to: | | | | | |
| arsenic | | | 160 | 29 | |
| indium | | | 51 | <9 | |
| Cumulative selectivity: | | | | | |
| arsenic | | | | 4640 | |
| indium | | | | <460 | |

EXAMPLE 5

A solution of gallium chloride in TBP (40%) obtained by placing the latter under the conditions of the invention in contact with an industrial solution of gallium chloride is twice placed in contact with 2N sodium carbonate at a ratio O/A=1. The results are compiled in the table below.

The sodium carbonate consumed is equal to 1.85N.

| | Volume (l) | Ga g/l | As mg/l | In mg/l | Na g/l | Cl⁻ g/l | Ca mg/l | OH⁻ (N) |
|---|---|---|---|---|---|---|---|---|
| Initial Organic phase | 4.15 | 37.7 | 44 | 2 | — | — | — | — |
| Organic phase 1st contact | — | 0.025 | 21 | 1 | — | — | — | — |
| Aqueous phase 1st contact | 4.4 | 32.5 | 12 | 1.6 | 30.0 | 61.4 | 15.9 | 0.85 |
| Organic phase 2nd contact | 4.1 | 0.021 | 17 | 1 | — | — | — | — |
| Aqueous phase 2nd contact | 4.3 | 3.2 | 16 | 2.5 | 19.1 | 35.8 | 35.8 | 1.3 |
| Re.extraction yield % | | 99.9 | 62.0 | 50.0 | | | | |

EXAMPLE 6

Electrolysis of gallium obtained in solutions from reextraction with sodium carbonate.

Electrolysis trials were carried out starting from sodium carbonate reextraction solutions and varying as parameters the concentration of free sodium carbonate and the current density using thermal control to keep the catholyte and the anolyte at 40° C. The cathodes and anodes are of stainless steel and a recovery boat for liquid gallium is located at the lower end of the cathode. During the electrolysis, the drops of gallium flow along the surface of the cathode (vertical) and are collected in the said boat. The solution containing gallium which supplies the electrolysis tank has the following composition:

Ga = 32.5 g/l
Cl$^-$ = 61.4 g/l
Na = 30.0 g/l
OH$^-$ = 0.85N
As = 12 mg/l
In = 1.6 mg/l

The parameters for the different trials are compiled in the following table:

| OH$^-$ (N) | Initial concentration | Current density A/m$^2$ | Duration (h) | Faradic yield % | Anodic phenomena |
|---|---|---|---|---|---|
| 0.85 | 32.5 | 250 | 12 | 60 to 14 | Evolution of Cl$_2$, formation of hypochlorites, attack |
| 0.85 | 32.5 | 80 | 3 | 62 | Evolution of Cl$_2$, attack |
| 2 | 25 | 80 | 3.5 | 83 | No dissolution appearance of some pitting |
| 2 | 25 | 120 | 5 | 79 | Slight attack |
| 3 | 20 | 120 | 4.5 | 77 | No attack, anolyte colourless |
| 3 | 15 | 240 | 2.5 | 72 | No attack anolyte slightly yellow |

The gallium obtained has a purity greater than 99.99% (In and As under the limit of detection, that is less than 3 g/t and less than 8 g/t respectively).

EXAMPLE 7

A solution of gallium chloride in TBP (loaded organic phase obtained by placing the latter under the conditions of the invention in contact with an industrial solution of gallium chloride is placed in contact, continuously within a stirred reaction vessel, with 7N sodium hydroxyde at a ratio O/A = 1.4. The gallium in the sodium carbonate after reextraction is analysed. The sodium carbonate consumed is equal to 2.6N. The results are compiled in the following table:

| Chemical Species | Loaded organic phase | Phases Sodium carbonate before reextraction | Sodium carbonate after reextraction |
|---|---|---|---|
| Ga in g/l | 45.0 | | 64.0 |
| As in mg/l | 15 × 10$^{-3}$ | | 0.02 |
| In in g/l | <10$^{-3}$ | | |
| NaOH in N | | 7 | |

The reextraction yield of gallium is greater than 99.9%.

I claim:

1. A process of hydrometallurgical treatment of a solution of materials containing gallium and at least one metalloid from Group V of the periodic table of the elements, comprising the steps of:
   a) adding hydrochloric acid and an alkali metal chloride or an alkaline earth metal chloride to said solution to form gallium chloride so that the concentration of chloride ions, not counting those bonded to gallium, is in a range of from 4 to 10N and the acidity of said solution is in a range of from 1 to about 5N;
   b) placing the adjusted solution of step a) in contact with an organic phase comprising at least one neutral pentavalent phosphorus compound having a phosphorus-oxygen double bond, wherein the gallium chloride is extracted by the organic phase; and
   c) reextracting the gallium from the organic phase.

2. Process according to claim 1, wherein said phosphorus compound is a trialkylphosphate.

3. Process according to claim 2, wherein said phosphorus compound is tributylphosphate.

4. Process according to claim 1, wherein step b is carried out so that the concentration of gallium chloride in the organic phase is equal to 90% of its saturation value if it were the only extractable element.

5. Process according to claim 4, the control of the concentration of gallium chloride is carried out through the ratio of organic phase to aqueous phase.

6. Process according to claim 1, wherein the redox potential of the solution before step a is such that two thirds of said at least one metalloid from Group V of the periodic table of the elements is in the pentavalent form.

7. Process according to claim 1, wherein the reextraction step of gallium from said organic phase takes place in a sodium hydroxide medium.

8. A process according to claim 1, further comprising the step of d) recovering the reextracted gallium by electrolysis in an electrolyte whose concentration of free base is at least equal to 4N.

9. A process of hydrometallurgical treatment of a solution of materials containing gallium and at least one metalloid from Group V of the periodic table of elements, comprising the steps of:
   forming a suspension from an aqueous composition comprising gallium and at least one metalloid from Group V of the periodic table by adjusting the pH thereof to a value not lower than 3, so that the gallium forms an insoluble trihydroxide;
   blowing chlorine gas through the thus-obtained suspension;
   separating solids therefrom to obtain a solution;
   adding hydrochloric acid and an alkali metal chloride or an alkaline earth metal chloride to said solution to form gallium chloride so that the concentration of chloride ions, not counting those bonded to gallium, is in a range of from 4 to 10N and the acidity of said solution is in a range of from 1 to about 5N;
   placing the adjusted solution of the immediately preceding steps in contact with an organic phase comprising at least one neutral pentavalent phosphorus compound having a phosphorus-oxygen double bond, and extracting the gallium chloride by the organic phase; and
   reextracting the gallium from the organic phase.

10. Process according to claim 9, wherein the temperature of said solution during step a1) is in a range of from about 50° to about 70° C.

11. Process according to claim 9, wherein said suspension of said materials containing gallium is an aqueous suspension produced at ambient temperature.

12. Process according to claim 11, wherein during step a1) the temperature is allowed to rise under the effect of the reaction exotherm.

13. Process according to claim 11, wherein at the beginning of step a1) said solution has a pH within the range from 3 to 8.

14. Process according to claim 9, wherein the concentration of solids in the suspension of materials containing gallium is in the range 50 to 500 grams per liter.

* * * * *